United States Patent
Wallace et al.

(10) Patent No.: US 10,030,358 B2
(45) Date of Patent: Jul. 24, 2018

(54) NON-CONTACT LOCATION AND ORIENTATION DETERMINATION OF AN IMPLEMENT COUPLED WITH A MOBILE MACHINE

(71) Applicant: Trimble Inc., Sunnyvale, CA (US)

(72) Inventors: Gregory Craig Wallace, Arvada, CO (US); Gregory C. Best, San Francisco, CA (US); Mark Nichols, Christchurch (NZ); Scott Crozier, Westminster, CO (US)

(73) Assignee: Trimble Inc., Sunnyvale, CA (US)

( * ) Notice: Subject to any disclaimer, the term of this patent is extended or adjusted under 35 U.S.C. 154(b) by 0 days.

(21) Appl. No.: 14/180,302

(22) Filed: Feb. 13, 2014

(65) Prior Publication Data

US 2015/0225923 A1  Aug. 13, 2015

(51) Int. Cl.
*E02F 3/84* (2006.01)
*E02F 9/26* (2006.01)
(Continued)

(52) U.S. Cl.
CPC .............. *E02F 3/847* (2013.01); *E02F 9/261* (2013.01); *E02F 9/264* (2013.01); *G01C 15/002* (2013.01);
(Continued)

(58) Field of Classification Search
CPC ... E02F 3/84; E02F 3/841; E02F 3/842; E02F 3/844; E02F 3/845; E02F 3/847;
(Continued)

(56) References Cited

U.S. PATENT DOCUMENTS 5,621,426 A    4/1997  Okada et al.
5,880,681 A *  3/1999  Codina et al. ........... 340/870.28
(Continued)

FOREIGN PATENT DOCUMENTS

CN    1906362 A     1/2007
CN   102770606 A    11/2012
(Continued)

OTHER PUBLICATIONS

Robotics Tutorial 5 (C#)—Using Advanced Services accessed at https://msdn.microsoft.com/en-us/library/bb483042.aspx (Year: 2012).*
(Continued)

*Primary Examiner* — Adam R Mott
(74) *Attorney, Agent, or Firm* — Kilpatrick Townsend & Stockton

(57) ABSTRACT

A method and system for non-contact location and orientation determination for an implement coupled with a mobile machine. One example detects an orientation of a recognized feature of an implement with a sensor mounted at a fixed location on the mobile machine. A range from the sensor to the recognized feature of the implement is also determined. In addition, a known operating envelope of the implement coupled with the mobile machine is accessed. The known operating envelope of the implement is then combined with the orientation and the range from the sensor to determine a position of the implement with respect to the mobile machine.

22 Claims, 9 Drawing Sheets

(51) Int. Cl.
 *G01C 15/00* (2006.01)
 *E02F 9/20* (2006.01)
 *E02F 3/76* (2006.01)

(52) U.S. Cl.
 CPC ........... *E02F 3/7613* (2013.01); *E02F 3/7618* (2013.01); *E02F 3/7668* (2013.01); *E02F 3/842* (2013.01); *E02F 9/2045* (2013.01)

(58) Field of Classification Search
 CPC ......... E02F 9/2037; E02F 9/264; E02F 9/263; E02F 9/2041; E02F 3/7618; E02F 3/7668; E02F 3/7613; E02F 9/2045; E02F 9/261; E01C 19/006; G05D 2201/0202; G01C 15/002
 See application file for complete search history.

(56) References Cited

U.S. PATENT DOCUMENTS

| | | | |
|---|---|---|---|
| 8,478,492 | B2 | 7/2013 | Taylor et al. |
| 2003/0007160 | A1* | 1/2003 | Smith .................... F41H 11/24 356/614 |
| 2005/0197756 | A1* | 9/2005 | Taylor et al. .................... 701/50 |
| 2011/0169949 | A1 | 7/2011 | McCain et al. |
| 2011/0213529 | A1* | 9/2011 | Krause et al. .................... 701/50 |
| 2013/0108403 | A1* | 5/2013 | Atkinson ....................... 414/685 |
| 2013/0319122 | A1* | 12/2013 | Epureanu ............... G01B 11/14 73/655 |

FOREIGN PATENT DOCUMENTS

| | | |
|---|---|---|
| EP | 2187166 A2 | 5/2010 |
| WO | 2015/123402 A1 | 8/2015 |

OTHER PUBLICATIONS

International Search Report, dated May 15, 2015, for PCT/US2015/015582, filed Feb. 12, 2015, 3 pages.
International Preliminary Report on Patentability and Written Opinion of the International Searching Authority, dated Aug. 25, 2016, for PCT/US2015/015582, filed Feb. 12, 2015, 10 pages.
First Office Action for Application No. 201580008743.6 dated Feb. 12, 2018, 9 pages.

* cited by examiner

NON-CONTACT LOCATION AND ORIENTATION DETERMINATION OF AN IMPLEMENT COUPLED WITH A MOBILE MACHINE

BACKGROUND

Earth moving machines such as bulldozers, motor graders, scrapers, excavators, etc., are used to contour the ground for a variety of projects such as construction (e.g., roads, buildings, parks, and the like), mining, and agriculture. When the machine is in use, a human operator is often relied upon to know the location and orientation of the working edge of the implement (e.g., the bottom edge of a bulldozer implement). However, the human operator can be prone to mistakes, inattention, distraction and the like.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

DESCRIPTION OF EMBODIMENTS

Figure 1:
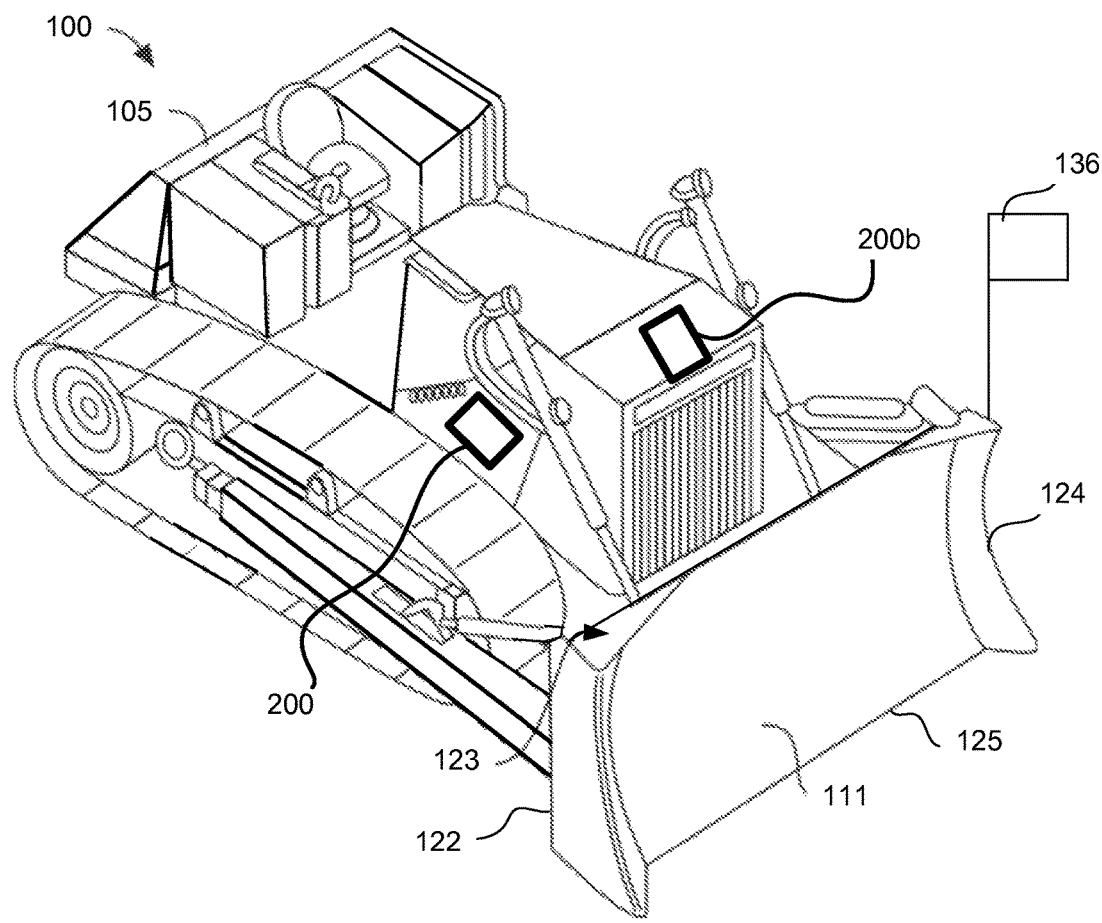
FIG. 1 shows a system utilizing non-contact based determination of the position and orientation of an implement with respect to a bulldozing mobile machine, according to various embodiments.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "capturing", "determining", "outputting", "inputting", "providing", "receiving", "utilizing", "obtaining", "improving", "accessing", "detecting" or the like, often refer to the actions and processes of an electronic computing device/system, such as a mobile phone, an electronic personal display, and/or a mobile (i.e., handheld) multimedia device, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

In the following discussion, implement refers to items such as the blade of a bulldozer or motor grader, the bucket of an excavator, the forks of a forklift, and the like.

Mobile machines which can use implements include, but are not limited to, a bulldozer, a motor grader, an excavator, a skid-steer loader, a scraper, a trencher, a trimmer, a tractor with an attachment (e.g., a grading attachment), a paver (e.g., a concrete or an asphalt paver), a slip form concrete machine (e.g., a curb and gutter machine), a combine, a harvester, a seeder, a cultivator, a planter and the like. It is appreciated that the term "excavator" may refer to a standard excavator, a tilting bucket excavator, a rotating bucket excavator, as well as other configurations utilizing extra boom and stick components or front bucket configurations. While these particular mobile machines are recited, embodiments of the present invention are well suited to be implemented in a variety of mobile machines used in agricultural, industrial, construction, mining, military, commercial, and consumer applications.

With reference now to FIG. 1, FIG. 1 shows a system 100 utilizing non-contact based determination of the position and orientation of an implement with respect to a mobile machine in accordance with embodiments of the present invention. In the embodiment of FIG. 1, the implement 111 is a blade and the mobile machine 105 is a bulldozer.

In the embodiment of FIG. 1, a sensor system 200 is coupled with bulldozer, and calibrated to determine the position of implement 111 relative to mobile machine 105. In one embodiment, sensor system 200 monitors the position of implement 111 and determines when it has moved from a first position to a second position. For example, sensor system 200 may be focused on recognized feature of implement 111 itself, such as the right edge 122, top edge 123, left edge 124, bottom edge 125, or a portion of implement 111. When implement 111 is moved from a first position to a second position relative to mobile machine 105 (e.g. from a raised position to a lowered position), sensor system 200 will recognize the change in range and/or orientation and determine the new position of implement 111.

In another embodiment, the recognized features may be a telltale 136 attached to the implement 111. In general, telltale 136 refers to a standoff fixedly mounted on implement 111. For example if implement 111 is a bucket and the bucket is being used underwater, or the like, sensor system 200 would not be able to detect the bucket. However, by using telltale 136 which was a known distance from and fixedly attached to the bucket, sensor system 200 would be able to continue monitoring the range and orientation of the bucket.

In another embodiment, the recognized feature may be a fiducial designed to improve a camera's detection capabilities. In yet another embodiment, the recognized feature may be a known light pattern. One example of a known light pattern is a structured light that projects a known pattern of pixels (often grids or horizontal bars) on to the implement. The way that pattern deforms when striking the implement surface will allow a vision type sensor to calculate the depth and surface information with respect to the implement.

In another embodiment of the present invention, determining the position of implement 111 may comprise a sensor system 200 at a first position and a second sensor system 200b in a second position.

Figure 2:
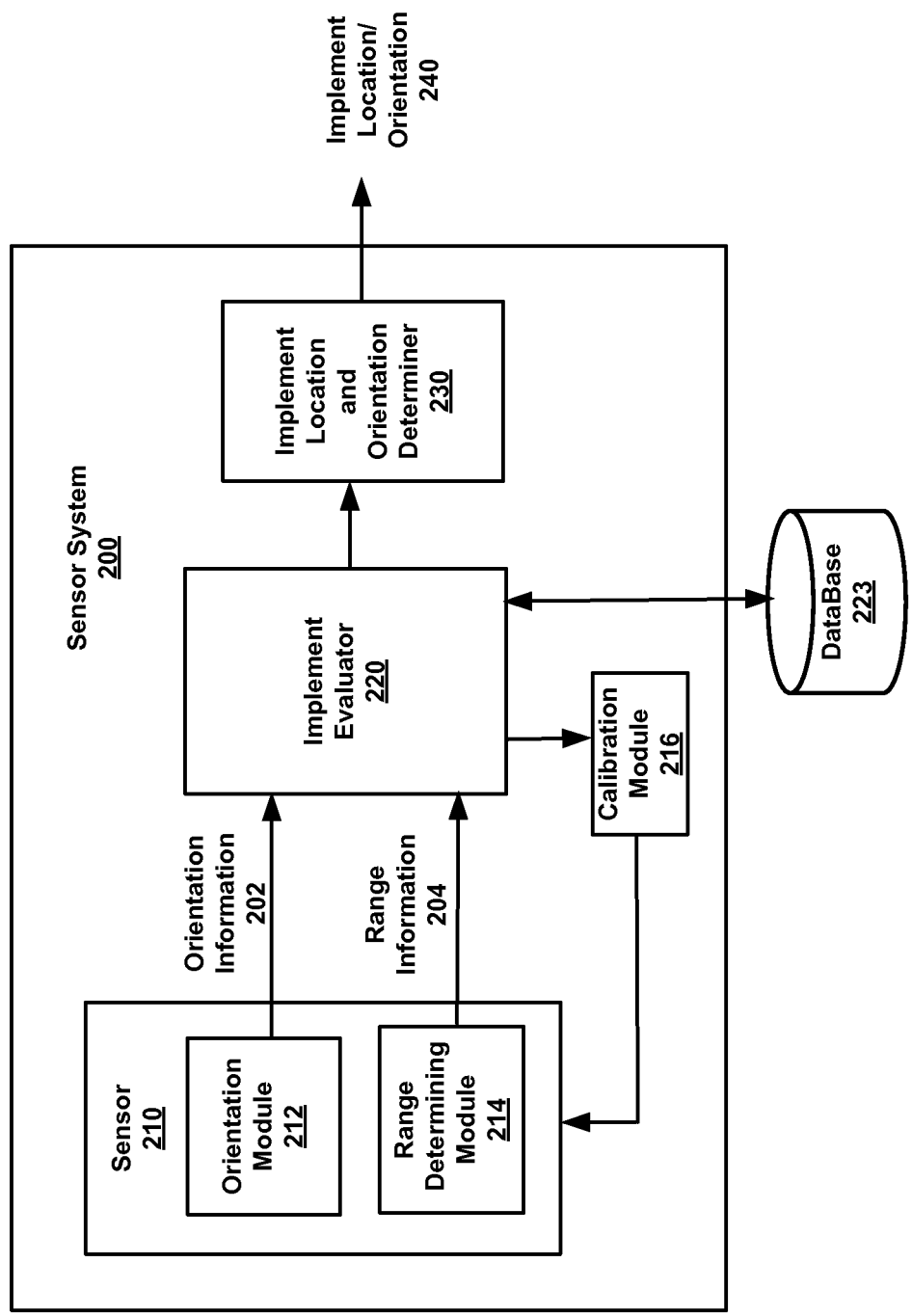
FIG. 2 illustrates a system for non-contact location and orientation determination of an implement coupled with a mobile machine, according to various embodiments.

With reference now to FIG. 2, a sensor system 200 for non-contact location and orientation determination of an implement coupled with a mobile machine is shown according to various embodiments. In one embodiment, sensor system 200 includes a sensor 210 having an orientation module 212 and a range determiner such as range determining module 214. Sensor system 200 also includes a calibration module 216, an implement evaluator 220 and an implement location and orientation determiner 230.

With reference now to sensor 210, in one embodiment, sensor 210 is a radar on a chip (ROACH). In general, a ROACH system will include a radio frequency integrated circuit (RFIC), an antenna and a waveform design and signal processing. In another embodiment, sensor 210 is a laser. In yet another embodiment, the sensor 210 may be a visual sensor such as a camera, a stereo camera, a depth camera and the like. In general, a depth camera produces a depth measurement to each pixel in the image. Examples include, but are not limited to, a time-of-flight camera, a wavefront coding camera and a light-field camera.

In general, a light-field camera is a camera that uses an array of small or micro-lenses to capture light field information for a scene. A time-of-flight camera resolves range information based on the speed of light. By measuring the time-of-flight of a light signal between the camera and the implement for any number of points of the image. In one embodiment, the time-of-flight camera may be a scannerless type in which the entire scene is captured with each laser or light pulse. In another embodiment, the time-of-flight camera may be a scanning type which utilizes a point-by-point measurement system with each laser beam. In general, wavefront coding uses a cubic phase modulating element in conjunction with deconvolution to extend the depth of field of a digital imaging system.

In one embodiment, sensor system 200 is a 3 dimensional sensor mounted at a known location on the mobile machine but not mounted on the implement coupled with the mobile machine. In another embodiment, sensor system 200 includes a single axis sensor and a plurality of sensor systems 200 is utilized. For example, as shown in FIG. 1, sensor system 200 includes a first single axis sensor 210 mounted at the known location on the mobile machine and sensor system 200b includes a second single axis sensor 210 mounted at a second known location on the mobile machine 105. The orientation of the single axis sensor 210 may be selected from a horizontal axis sweeping sensor and a vertical axis sweeping sensor, two horizontal axis sweeping sensors, and two vertical axis sweeping sensors.

Sensor 210 includes orientation module 212 to provide orientation information 202 for a recognized feature of the implement to implement evaluator 220. In addition, sensor 210 includes range determining module 214 to provide range information 204 for a recognized feature of the implement to implement evaluator 220. In one embodiment, the recognized feature may be an edge of the implement 111. In another embodiment, the recognized feature may be a corner of the implement 111. In yet another embodiment, the recognized feature may be a telltale 136 attached to implement 111.

Implement evaluator 220 accesses database 223, an electronic database, which contains known operating envelope characteristics of the implement coupled with the mobile machine 105. The operating envelope characteristics may include implement size, implement connection type, and the like. Similarly, database 223 may include range of motion characteristics for the implement, such as but not limited to, pivot points, a number of actuators, the mechanical linkages and the like.

In one embodiment, Implement evaluator 220 will initially provide the implement and machine specific characteristics to calibration module 216 to calibrate sensor 210. In general, calibration module 216 includes a determiner to determine a flat and level orientation of the implement with respect to the mobile machine. In addition, calibration module 216 includes a range of motion definer to define the range of motion characteristics of the implement with respect to the mobile machine.

Once sensor 210 is calibrated for the implement coupled to mobile machine 105, implement evaluator 220 will provide the orientation information 202, range information 204 and operating envelope characteristics to implement location and orientation determiner 230.

Implement location and orientation determiner 230 will utilize the information from implement evaluator 220 to determine the orientation and location of the implement 240 with respect to mobile machine 105.

Figure 3:
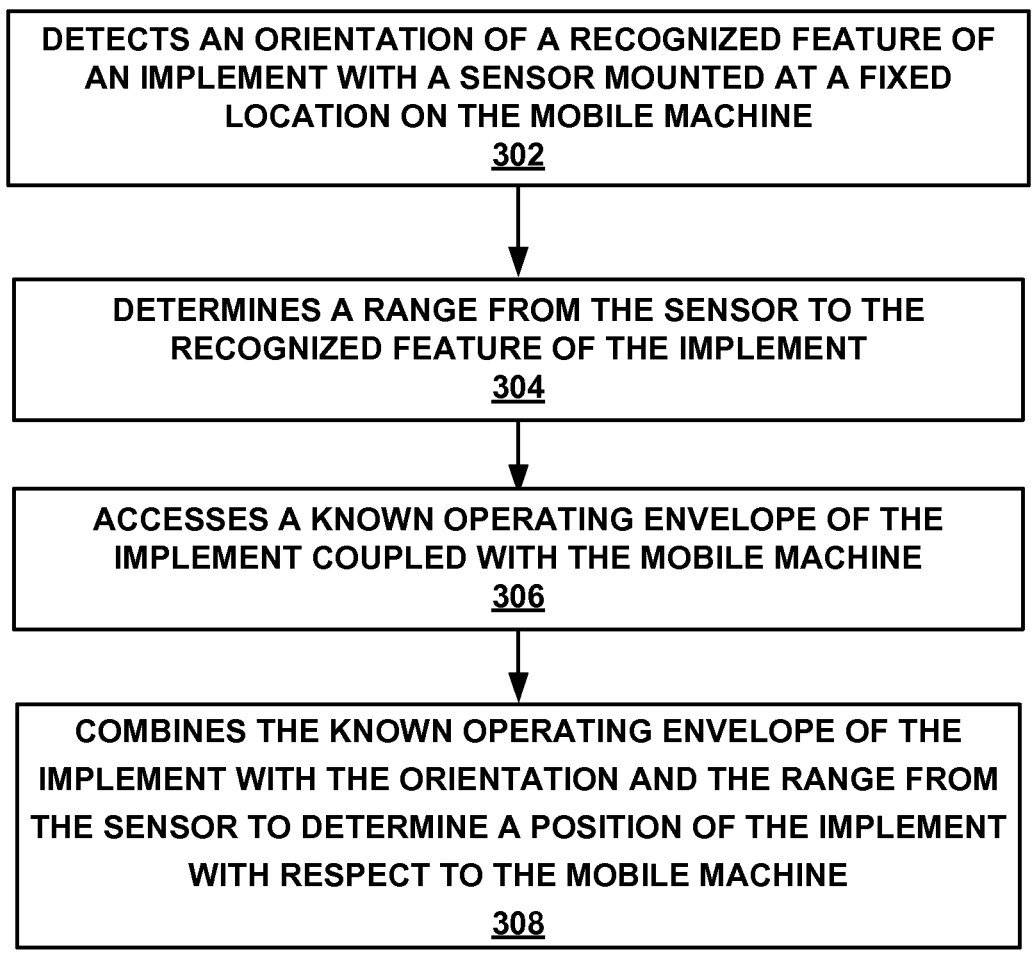
FIG. 3 illustrates a flow diagram of a method for non-contact location and orientation determination of an implement coupled with a mobile machine with respect to the mobile machine, according to various embodiments.

Referring now to FIG. 3, a flow diagram 300 of a method for non-contact location and orientation determination of an implement coupled with a mobile machine 105 with respect to the mobile machine is shown according to various embodiments. In addition, a number of the embodiments will include information illustrated in FIGS. 4-6B.

Figure 4:
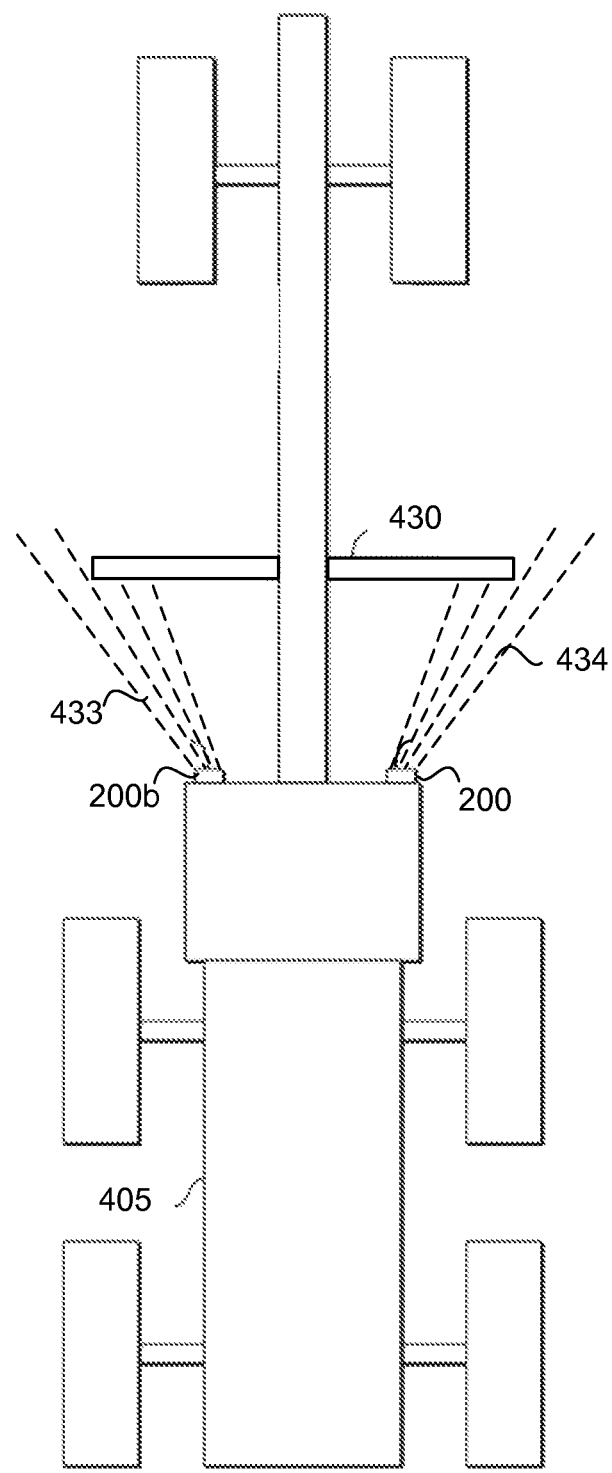
FIG. 4 illustrates the sensor system utilizing non-contact based determination of the position and orientation of an implement with respect to a grading mobile machine, according to various embodiments.

In general, FIG. 4 illustrates a grader 405 with an implement 430 according to various embodiments. A sensor system 200 is mounted on the right side and is ranging and locating the edge of the implement 430 as shown with ranging lines 434. A sensor system 200b is mounted on the left side and is ranging and locating the edge of the implement 430 as shown with ranging lines 433.

Figure 5B:
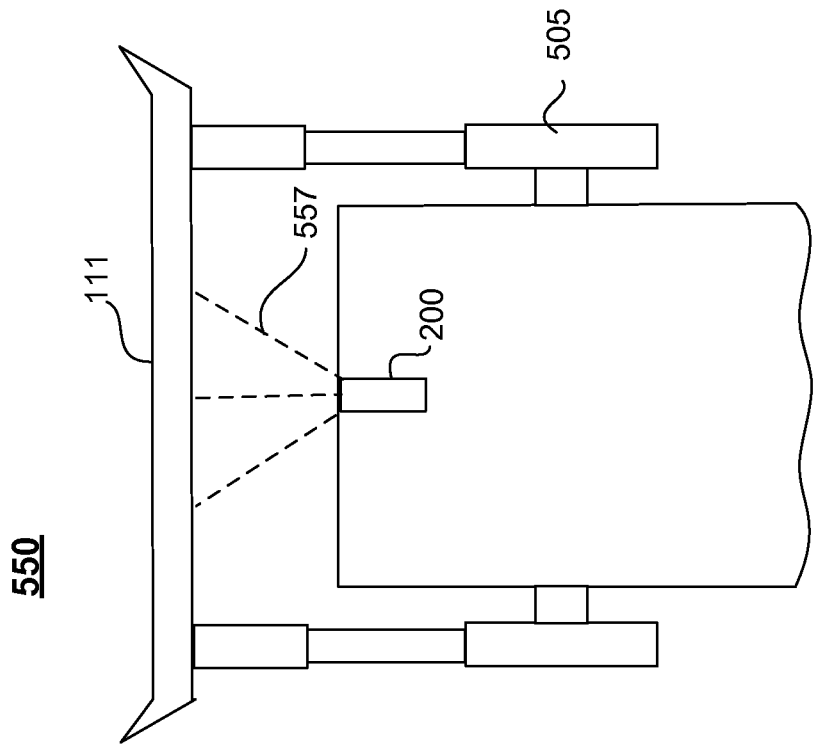
FIG. 5B is a top view of the mobile machine with a sensor system, the mobile machine having a two arm type hydraulic mounted implement in a different location, according to various embodiments.
Figure 5A:
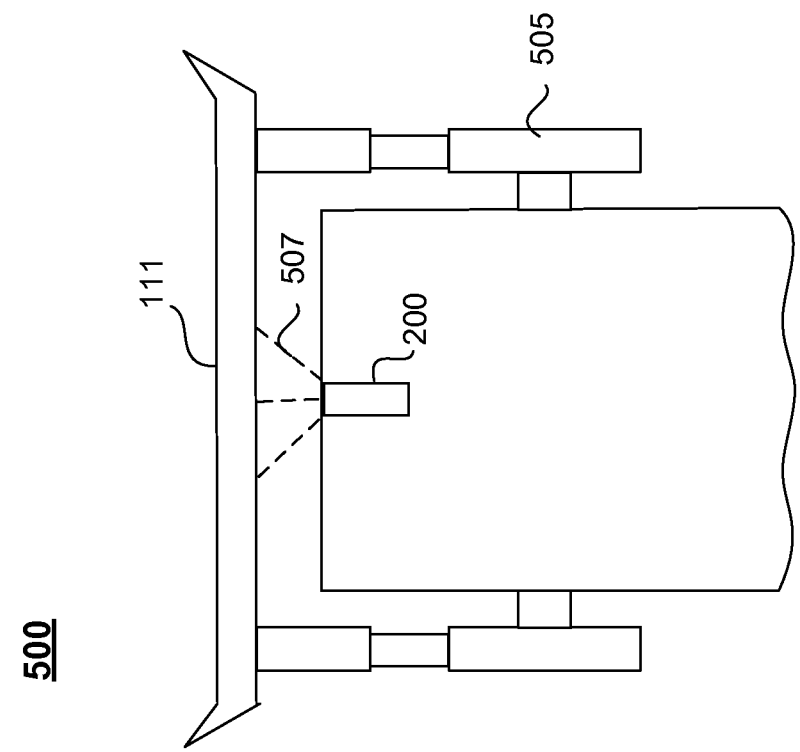
FIG. 5A is a top view of a mobile machine with a sensor system, the mobile machine having a two arm type hydraulic mounted implement, according to various embodiments.

FIG. 5A is a top view of a mobile machine 500 with a sensor system 200, the mobile machine 500 having a two arm 505 type hydraulic mounted implement 111, according to various embodiments. In one embodiment, sensor system 200 is a 3 dimensional sensor and is ranging and locating implement 111 as shown with ranging lines 507.

FIG. 5B is a top view of a mobile machine 550 with a sensor system 200, the mobile machine having a two arm 505 type hydraulic mounted implement in a different location than that of mobile machine 500, according to various embodiments. In one embodiment, sensor system 200 is a 3 dimensional sensor and is ranging and locating implement 111 as shown with ranging lines 557.

Figure 6B:
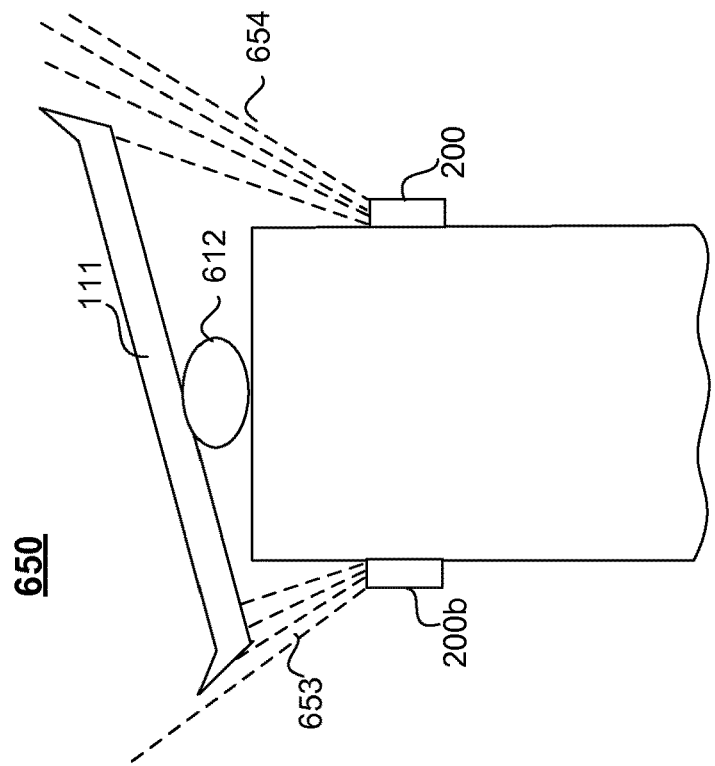
FIG. 6B is a top view of a mobile machine with a sensor system, the mobile machine having a ball mounted implement in a different location, according to various embodiments.
Figure 6A:
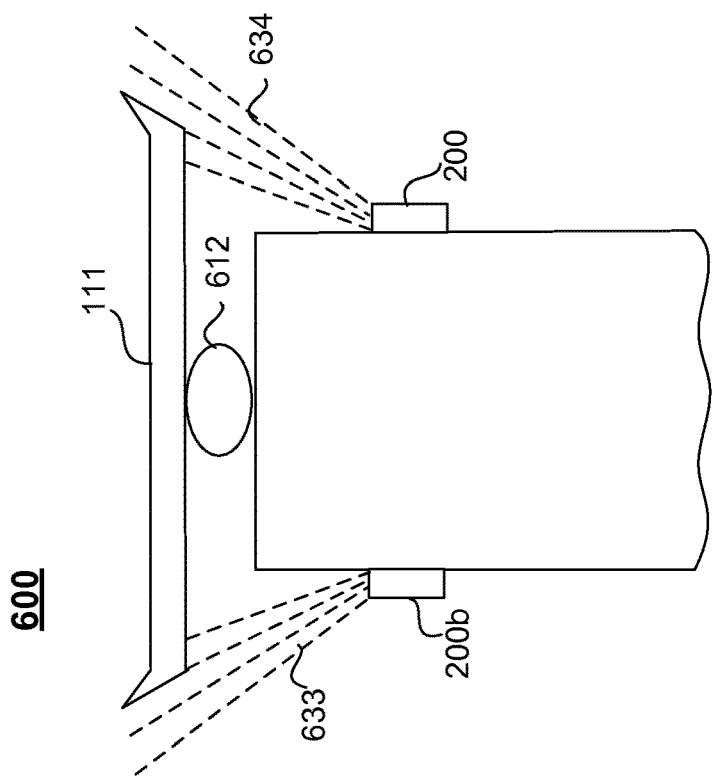
FIG. 6A is a top view of a mobile machine with a sensor system, the mobile machine having a ball mounted implement, according to various embodiments.

FIG. 6A is a top view of a mobile machine 600 with sensor systems 200 and 200b, the mobile machine having a ball 612 mounted implement 111, according to various embodiments. In one embodiment, sensor system 200 is a single axis type sensor and is mounted on the right side and is ranging and locating the edge of the implement 111 as shown with ranging lines 634. Similarly, sensor system 200b is mounted on the left side and is ranging and locating the edge of the implement 111 as shown with ranging lines 633.

FIG. 6B is a top view of a mobile machine 650 with sensor systems 200 and 200b, the mobile machine having a ball 612 mounted implement 111 in a different location than that of mobile machine 600, according to various embodiments. In one embodiment, sensor system 200 is a single axis type sensor and is mounted on the right side and is ranging and locating the edge of the implement 111 as shown with ranging lines 654. Similarly, sensor system 200b is mounted on the left side and is ranging and locating the edge of the implement 111 as shown with ranging lines 653.

With reference now to 302 of FIG. 3 and to FIG. 1, one embodiment detects an orientation of a recognized feature of implement 111 with a sensor system 200 mounted at a fixed location on the mobile machine 105. By placing sensor system 200 at a less active location on mobile machine 105 a less robust sensor can be used. In other words, since sensor system 200 is not in contact with implement 111 it will not be subjected to the stresses, damages and movements associated with implement 111.

In one embodiment, sensor system 200 is a 3 dimensional sensor mounted at a known location on mobile machine 105. In another embodiment, such as shown in FIG. 4, a first single axis sensor system 200 is mounted at the known location on mobile machine 405 and at least a second single axis sensor system 200b is mounted at a second known location on mobile machine 405, where neither the first nor second single axis sensor system is mounted on implement 111 coupled with mobile machine 105. In general, the first and second single axis sensors 200 and 200b may be selected from the group consisting of: a horizontal axis sweeping sensor and a vertical axis sweeping sensor, two horizontal axis sweeping sensors, or two vertical axis sweeping sensors.

In general, as shown in FIG. 1, a recognized feature may include an edge of implement 111, a corner of implement 111, a telltale 136 attached to implement 111, and the like.

In one embodiment, after sensor system 200 is mounted, sensor system 200 is calibrated with respect to implement 111. In general, calibrating or benching implement 111 with respect to sensor system 200 creates a known zero reference in one degree of freedom which is meaningful for the implement relative to mobile machine 105. In one embodiment, the calibration can be performed by establishing a flat and level orientation of implement 111 with respect to mobile machine 105. In addition, the calibration includes ascertaining the range of motion characteristics of the implement with respect to mobile machine 105.

For example, in one embodiment the calibration may be performed by parking mobile machine 105 on a known flat surface and then lowering implement 111 to the point that it touches the ground uniformly. That is, implement 111 is siting flat and level. By establishing a flat and level orientation, nonlinear mechanisms and controls which may be inside the cab of mobile machine 105 are taken out of the calibration process. Although utilizing a flat and level surface is one method for performing the calibration, the calibration may also be performed on uneven surfaces using a number of other methods. For example, if a flat surface is not readily available, the calibration may be performed with the use of levels, lasers, squares, and the like. The calibration is important to establish an implement 111-to-mobile machine 105 location and orientation baseline. Once the baseline is determined, sensor system 200 can monitor for change in the orientation information and the range information and thereby determine a change in position of the implement with respect to mobile machine 105 as a function of the established baseline.

With reference still to 302, after performing the initial calibration, sensor system 200 will be able to detect the orientation of implement 111 from that point on so that implement 111 will remain in a known location in a 3d environment. As stated herein, the technology can use 3-D sensor system 200 such as shown in FIGS. 5A and 5B or a plurality of single axis sweeping sensor system 200 such as shown in FIGS. 6A and 6B. In one example, such as shown in FIG. 1 a plurality of single axis sensors may perform edge detection to determine a top profile of implement 111. For example, if the machine was a bulldozer one sensor system 200b may be used to pick up a top edge and another sensor system 200 may be used to pick up the side edge of implement 111. By adding in a range measurement from the sensor systems to the implement the orientation and location of implement 111 may be ascertained without the sensor needing to physically contact the implement.

In one embodiment, a weighted average of the width of the single axis sensor beam is used to locate the center point. For example, if the beam is a few centimeters wide, the weighted average of the measurements received from the sensor will be used to determine the center point of the beam and thus, the range from implement 111 to sensor system 200.

Referring now to 304 of FIG. 3 and to FIGS. 4-6B, one embodiment determines a range from sensor system 200 to the recognized feature of the implement 111. For example, one embodiment utilizes a non-contact based ranging technology such as radar, a laser or the like. In another embodiment the ranging technology is a micro-electro-mechanical systems (MEMS) based 2-D mirror performing a raster type scan. As such, the range determining module 214 portion of the sensor would include an emitter and receiver and may be single axis or dual axis. In addition, the laser may be electronically swept or mechanically swept.

One advantage to direct ranging is that edge detection can be performed very quickly. For example, as shown in FIG. 6A, sensor system 200 is illustrated with ranging lines 634. A portion of the beams of ranging lines 634 are hitting implement 111 while another portion of beams of ranging lines 634 are not. In one example, beams of ranging lines 634 that are hitting implement 111 may have a range of 2 meters while beams of ranging lines 634 that miss implement 111 may have ranges of greater than 10 meters. Thus, because of the relatively close range between sensor system 200 and implement 111 the edge can be recognized as the location where the range-distance disconnects occurs.

With reference now to 306 of FIG. 3 and to FIGS. 5A-6B, one embodiment accesses a known operating envelope of implement 111 coupled with mobile machine 105. The known operating envelope may be used for purposes such as ascertaining the implement's range of motion characteristics. The range of motion characteristics may include, but are not limited to, pivot points, a number of actuators, the mechanical linkages and the like. Thus, in one embodiment, the calibration and implement monitoring would be machine specific and in some cases mount specific.

Because sensor system 200 is calibrated to mobile machine 105 being monitored, sensor system 200 does not necessarily need to see the entire implement 111 to provide implement location and orientation information. For example, if a ball 612 type pivot is in middle of implement 111, then the left edge getting closer to sensor system 200 would mean that the right edge of the implement is further away from machine.

In one embodiment, the operating envelope such as the range of motion characteristics is also important to ensure that sensor system 200 does not lose the implement edge over the full range of movement. In another embodiment, a plurality of sensor systems 200 such as a left edge detector 200b and a right edge detector 200 of FIGS. 6A and 6B may be used to cover the entire operating envelope of implement 111. That way, if one edge sensor loses the reference location due to the implements range of motion the other sensor will be able to see its associated reference location.

Referring now to 308 of FIG. 3 and to FIG. 2, one embodiment combines the known operating envelope of implement 111 with the orientation and the range from sensor system 200 to determine a position of implement 111 with respect to mobile machine 105.

In other words, the technology detects range changes, e.g., the implement has been changed in pitch; and changes in recognized feature position, e.g., the implement has been rotated. By combining the range and orientation information, in conjunction with implement 111 dimensions, mounting styles, and motion characteristics for a given mobile machine 105, the technology will provide accurate implement location information.

Mobile Machine and Implement Geospatial Location Determination

Figure 7:
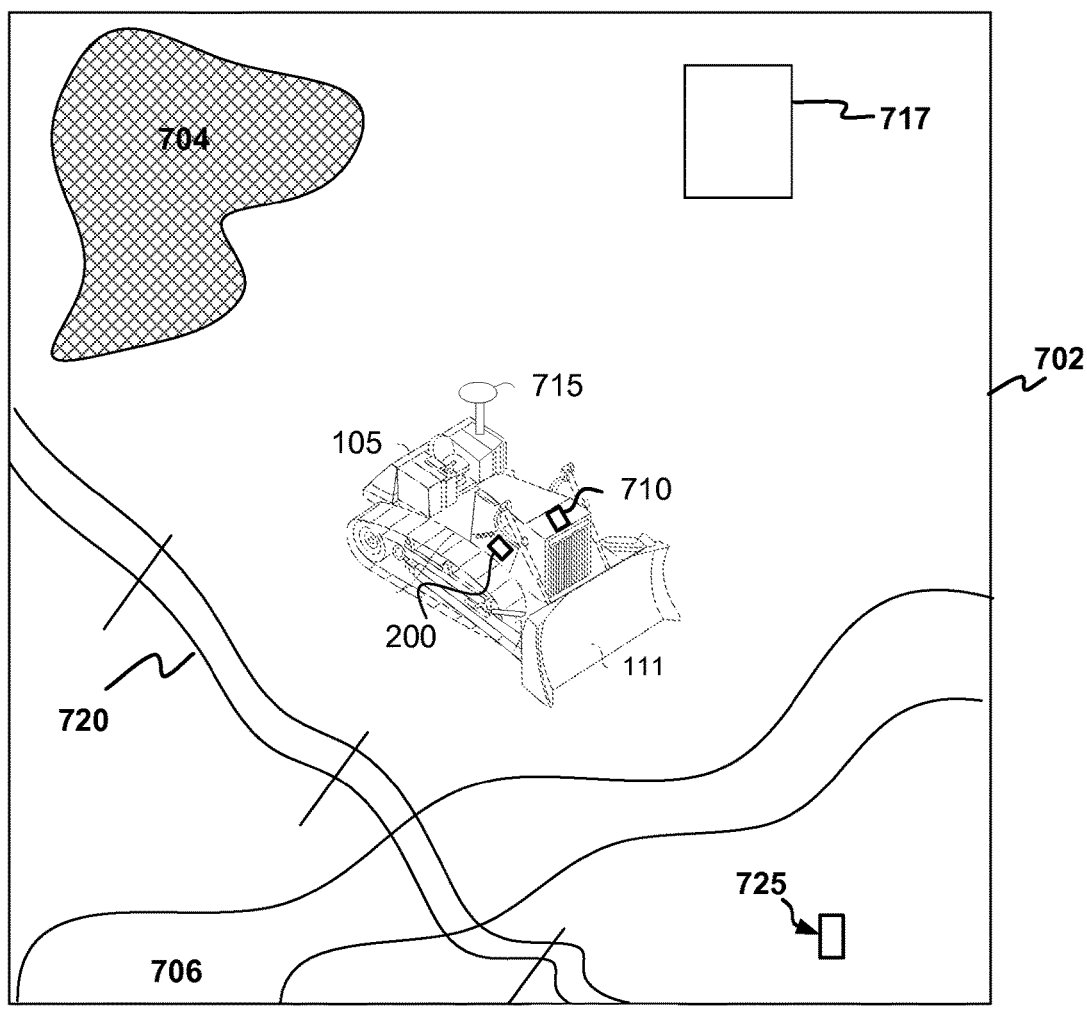
FIG. 7 is a map of a job site populated with recognized objects according to one embodiment of the present technology

With reference now to FIG. 7, a map of a job site is shown in accordance with one embodiment. In general, map 700 is user selectable and may be an aerial map, a topographic map, a terrain map, a physical map, a road map, a satellite image or the like. In addition, the map may be scaled based on the type of machine 105 being utilized, the size of the site, the desired granularity, or the like. Moreover, the scale may be adjusted either automatically or manually. In general, once the map 700 of the work area is selected one embodiment will project the location of machine 105 onto the map. In addition, a radius of operation 702, such as a geofence or the like may also be provided on the map 700.

In one embodiment, the location of machine 105 may be determined by a navigation satellite system (NSS) 715 mounted on machine 105. In this case, the position of machine 105 will be noted on the map. In addition, the position of implement 111 will also be provided by system 200 and as the distance between NSS 715 and sensor 210 is known, the position of implement 111 will also be accurately known. In one embodiment, the map 700 may be downloaded from the internet. For example, in one embodiment the map may be sourced from an application such as TrimbleOutdoors or from a website such as mytopo or Trimbleoutdoors.com. In another embodiment, map 700 may be automatically downloaded based on NSS 715 location or may be downloaded based input from a user such as: latitude and longitude, geodetic datums such as NAD 83 and WGS 84, or the like. In yet another embodiment, the map may be taken from a map database stored on a CD, DVD or other digital input coupled with the database without requiring an Internet connection.

Simultaneous Location and Mapping (SLAM)

Referring still to FIG. 7, in another embodiment, machine 105 may not include an NSS 715 receiver. Instead, site map 700 may be populated with a number of recognizable points of reference such as pond 704, building 717, power lines 720, road 706, base station 725 and the like. In one embodiment, machine 105 may be located by utilizing one or more sensing systems as a location information determiner.

For example, a scanner such as location and mapping sensor 710 may be used to determine the real world coordinate system such as a geo-spatial location or geo-spatial location information for the mobile machine. In one embodiment, location and mapping sensor 710 may be a Universal Total Station (UTS); a Laser reference; a Sonic reference; Machine vision (video based navigation); SLAM techniques using radar and/or cameras, and the like. In one embodiment, sensor 710 operates in a system similar to the sensor system 200 described herein. However, instead of sensor 710 scanning and ranging for implement 111, sensor 710 will scan an area around the mobile machine 105 and provide range information to at least one point of reference. As described herein, the point of reference could be natural, man-made, or deployable devices that are added to the area at known locations.

In addition, a database accessor will access a mapping database that includes location information for the at least one point of reference. In other words, the database accessor will geo-spatial location information. A position determiner such as implement location and orientation determiner 230 will utilize the range information 204 from sensor 710 in conjunction with the location information of the point of reference to determine the real world geo-spatial location of the location and mapping sensor 710.

Once the location of mobile machine 105 is determined by location and mapping sensor 710 mounted on machine 105; and as the distance between location and mapping sensor 710 and sensor system 200 is known, the position of implement 111 will also be accurately known (to include knowing geo-spatial location information and/or geo-spatial position information of the implement).

NSS Receiver

Figure 8:
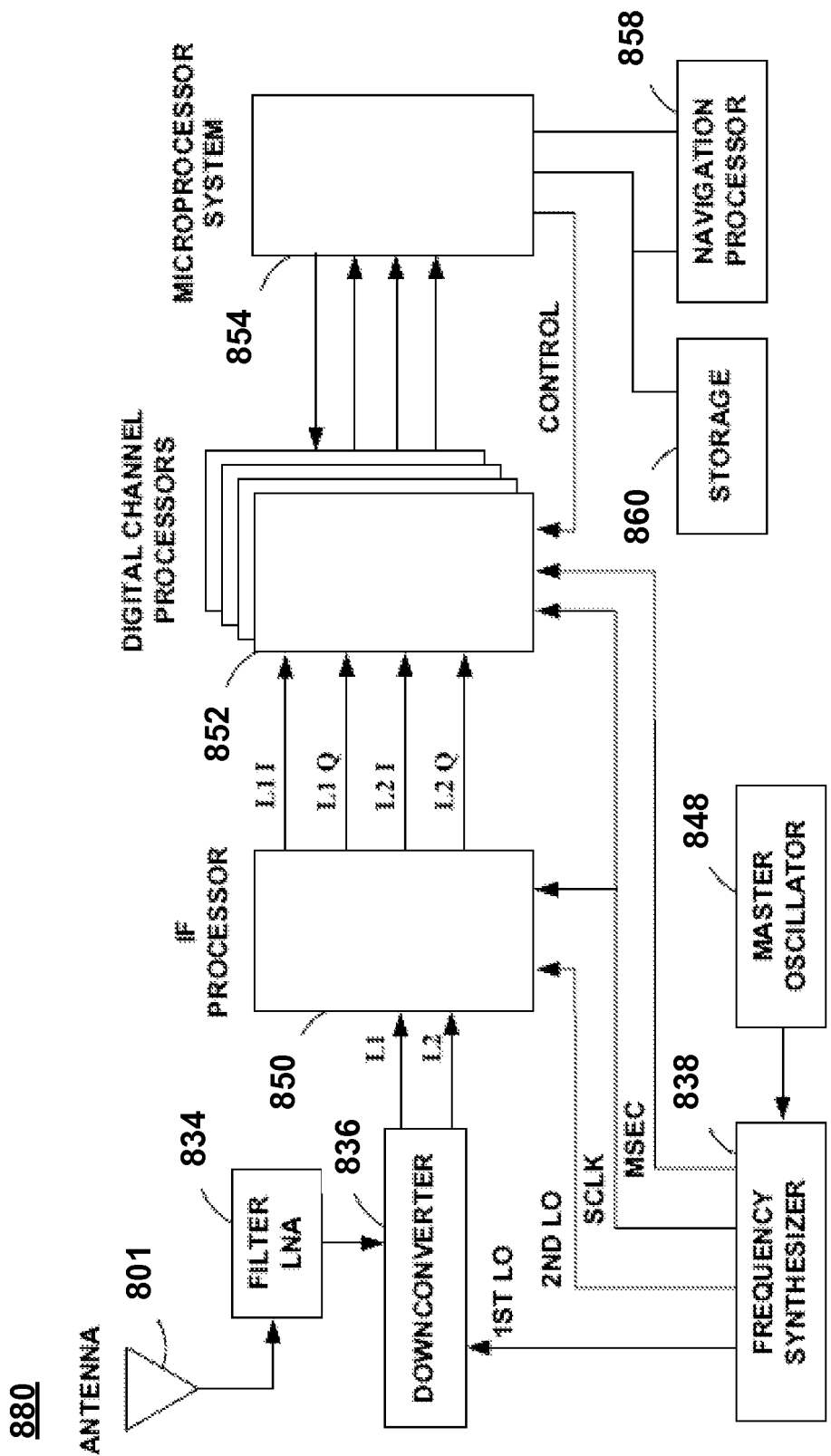
FIG. 8 is a block diagram of an example navigation satellite system (NSS) receiver which may be used in accordance with one embodiment of the present technology.

With reference now to FIG. 8, a block diagram is shown of an embodiment of an example NSS receiver which may be used in accordance with various embodiments described herein. In particular, FIG. 8 illustrates a block diagram of a NSS receiver in the form of a general purpose GPS receiver 880 capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" NSS receivers such as those used in the military and some civilian applications. Typically, the "consumer" grade NSS receivers do not access the L2 signal(s). Further, although L1 and L2 signals are described, they should not be construed as a limitation to the signal type; instead, the use of the L1 and L2 signal(s) is provided merely for clarity in the present discussion.

Although an embodiment of a GNSS receiver and operation with respect to GPS is described herein, the technology is well suited for use with numerous other GNSS signal(s)

including, but not limited to, GPS signal(s), Glonass signal(s), Galileo signal(s), and Compass signal(s).

The technology is also well suited for use with regional navigation satellite system signal(s) including, but not limited to, Omnistar signal(s), StarFire signal(s), Centerpoint signal(s), Beidou signal(s), Doppler orbitography and radio-positioning integrated by satellite (DORIS) signal(s), Indian regional navigational satellite system (IRNSS) signal(s), quasi-zenith satellite system (QZSS) signal(s), and the like.

Moreover, the technology may utilize various satellite based augmentation system (SBAS) signal(s) such as, but not limited to, wide area augmentation system (WAAS) signal(s), European geostationary navigation overlay service (EGNOS) signal(s), multi-functional satellite augmentation system (MSAS) signal(s), GPS aided geo augmented navigation (GAGAN) signal(s), and the like.

In addition, the technology may further utilize ground based augmentation systems (GBAS) signal(s) such as, but not limited to, local area augmentation system (LAAS) signal(s), ground-based regional augmentation system (GRAS) signals, Differential GPS (DGPS) signal(s), continuously operating reference stations (CORS) signal(s), and the like. In addition, the ground based systems may be pseudolites such as Trimble's Terralite system, ultra wide band (UWB) systems and the like that can operate as stand-alone or as augmentations to NSS systems.

Although the example herein utilizes GPS, the present technology may utilize any of the plurality of different navigation system signal(s). Moreover, the present technology may utilize two or more different types of navigation system signal(s) to generate location information. Thus, although a GPS operational example is provided herein it is merely for purposes of clarity.

Embodiments of the present technology may be utilized by NSS receivers which access the L1 signals alone, or in combination with the L2 signal(s). A more detailed discussion of the function of a receiver such as GPS receiver 880 can be found in U.S. Pat. No. 5,621,426. U.S. Pat. No. 5,621,426, by Gary R. Lennen, entitled "Optimized processing of signals for enhanced cross-correlation in a satellite positioning system receiver," incorporated by reference which includes a GPS receiver very similar to GPS receiver 880 of FIG. 8.

In FIG. 8, received L1 and L2 signal is generated by at least one GPS satellite. Each GPS satellite generates different signal L1 and L2 signals and they are processed by different digital channel processors 852 which operate in the same way as one another. FIG. 8 shows GPS signals (L1=1575.42 MHz, L2=1227.60 MHz) entering GPS receiver 880 through a dual frequency antenna 801. Antenna 801 may be a magnetically mountable model commercially available from Trimble® Navigation of Sunnyvale, Calif., 94085. Master oscillator 848 provides the reference oscillator which drives all other clocks in the system. Frequency synthesizer 838 takes the output of master oscillator 848 and generates important clock and local oscillator frequencies used throughout the system. For example, in one embodiment frequency synthesizer 838 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 834 performs filtering and low noise amplification of both L1 and L2 signals. The noise figure of GPS receiver 880 is dictated by the performance of the filter/LNA combination. The downconverter 836 mixes both L1 and L2 signals in frequency down to approximately 175 MHz and outputs the analogue L1 and L2 signals into an IF (intermediate frequency) processor 850. IF processor 850 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 852 inputs the digitally sampled L1 and L2 inphase and quadrature signals. All digital channel processors 852 are typically identical by design and typically operate on identical input samples. Each digital channel processor 852 is designed to digitally track the L1 and L2 signals produced by one satellite by tracking code and carrier signals and to form code and carrier phase measurements in conjunction with the microprocessor system 854. One digital channel processor 852 is capable of tracking one satellite in both L1 and L2 channels.

Microprocessor system 854 is a general purpose computing device which facilitates tracking and measurements processes, providing pseudorange and carrier phase measurements for a navigation processor 858. In one embodiment, microprocessor system 854 provides signals to control the operation of one or more digital channel processors 852. Navigation processor 858 performs the higher level function of combining measurements in such a way as to produce position, velocity and time information for the differential and surveying functions. Storage 860 is coupled with navigation processor 858 and microprocessor system 854. It is appreciated that storage 860 may comprise a volatile or non-volatile storage such as a Random Access Memory (RAM) or Read Only Memory (ROM), or some other computer readable memory device or media.

One example of a GPS chipset upon which embodiments of the present technology may be implemented is the Maxwell™ chipset which is commercially available from Trimble® Navigation of Sunnyvale, Calif., 94085.

Example Computer System Environment

Figure 9:
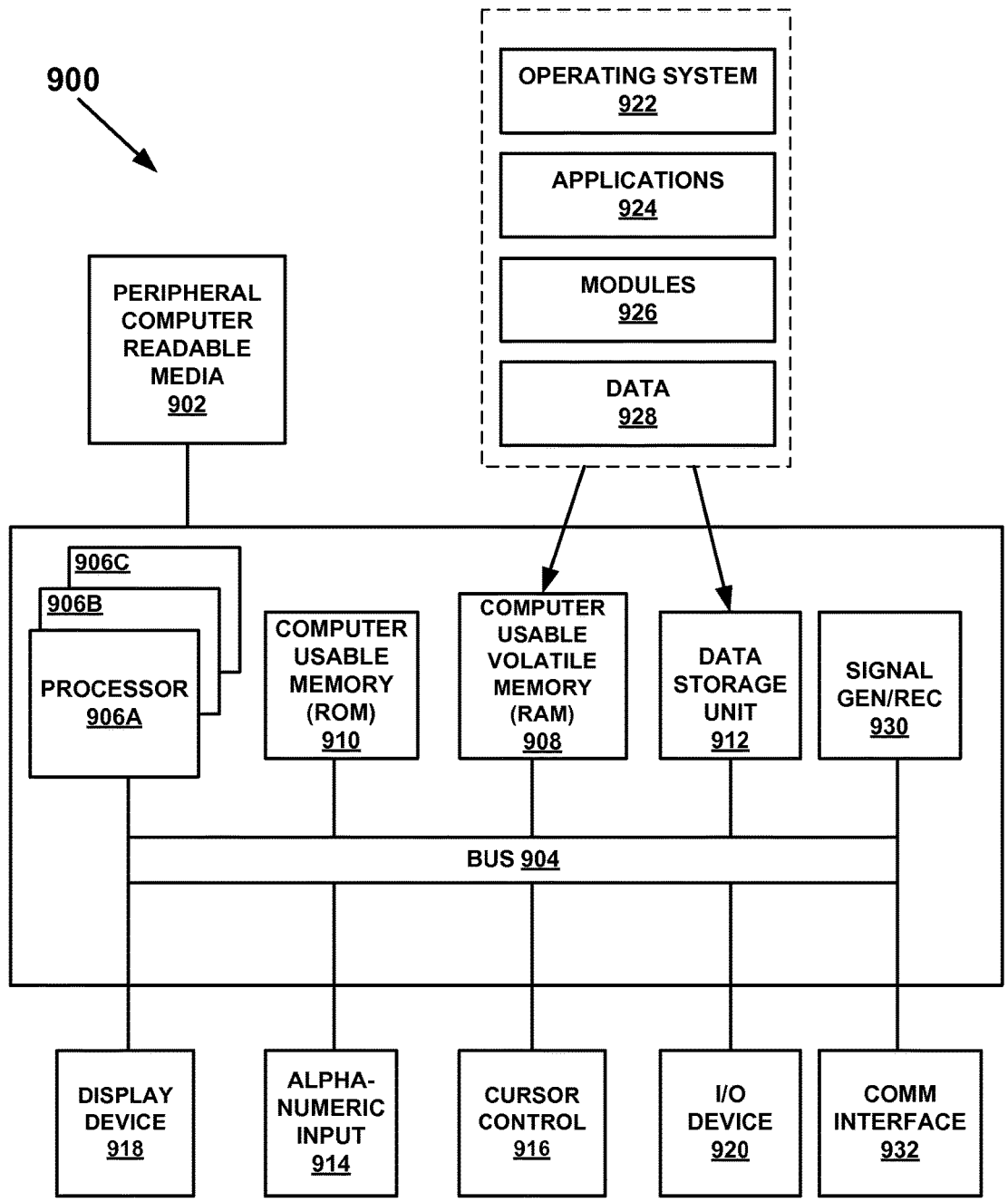
FIG. 9 shows an example computing system which may be included as a component of an eReader, according to various embodiments

With reference now to FIG. 9, portions of the technology for providing a communication composed of computer-readable and computer-executable instructions that reside, for example, in non-transitory computer-usable storage media of a computer system. That is, FIG. 9 illustrates one example of a type of computer that can be used to implement embodiments of the present technology. FIG. 9 represents a system or components that may be used in conjunction with aspects of the present technology. In one embodiment, some or all of the components of FIG. 1 or FIG. 3 may be combined with some or all of the components of FIG. 9 to practice the present technology.

FIG. 9 illustrates an example computing system 900 used in accordance with embodiments of the present technology. It is appreciated that system 900 of FIG. 9 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 9, computing system 900 of FIG. 9 is well adapted to having peripheral computer readable media 902 such as, for example, a floppy disk, a compact disc, a flash drive, and the like coupled thereto.

System 900 of FIG. 9 includes an address/data/control bus 904 for communicating information, and a processor 906A coupled to bus 904 for processing information and instructions. As depicted in FIG. 9, system 900 is also well suited to a multi-processor environment in which a plurality of processors 906A, 906B, and 906C are present. Conversely, system 900 is also well suited to having a single processor such as, for example, processor 906A. Processors 906A, 906B, and 906C may be any of various types of microprocessors. System 900 also includes data storage features such as a computer usable volatile memory 908, e.g. random access memory (RAM), coupled to bus 904 for storing information and instructions for processors 906A, 906B, and 906C.

System 900 also includes computer usable non-volatile memory 910, e.g. read only memory (ROM), coupled to bus 904 for storing static information and instructions for processors 906A, 906B, and 906C. Also present in system 900 is a data storage unit 912 (e.g., a magnetic or optical disk and disk drive) coupled to bus 904 for storing information and instructions. System 900 also includes an optional alphanumeric input device 914 including alphanumeric and function keys coupled to bus 904 for communicating information and command selections to processor 906A or processors 906A, 906B, and 906C. System 900 also includes an optional cursor control device 916 coupled to bus 904 for communicating user input information and command selections to processor 906A or processors 906A, 906B, and 906C. Optional cursor control device may be a touch sensor, gesture recognition device, and the like. System 900 of the present embodiment also includes an optional display device 918 coupled to bus 904 for displaying information.

Referring still to FIG. 9, optional display device 918 of FIG. 9 may be a liquid crystal device, cathode ray tube, OLED, plasma display device or other display device suitable for creating graphic images and alpha-numeric characters recognizable to a user. Optional cursor control device 916 allows the computer user to dynamically signal the movement of a visible symbol (cursor) on a display screen of display device 918. Many implementations of cursor control device 916 are known in the art including a trackball, mouse, touch pad, joystick or special keys on alpha-numeric input device 914 capable of signaling movement of a given direction or manner of displacement. Alternatively, it will be appreciated that a cursor can be directed and/or activated via input from alpha-numeric input device 914 using special keys and key sequence commands.

System 900 is also well suited to having a cursor directed by other means such as, for example, voice commands. System 900 also includes an I/O device 920 for coupling system 900 with external entities. For example, in one embodiment, I/O device 920 is a modem for enabling wired or wireless communications between system 900 and an external network such as, but not limited to, the Internet or intranet. A more detailed discussion of the present technology is found below.

Referring still to FIG. 9, various other components are depicted for system 900. Specifically, when present, an operating system 922, applications 924, modules 926, and data 928 are shown as typically residing in one or some combination of computer usable volatile memory 908, e.g. random access memory (RAM), and data storage unit 912. However, it is appreciated that in some embodiments, operating system 922 may be stored in other locations such as on a network or on a flash drive; and that further, operating system 922 may be accessed from a remote location via, for example, a coupling to the internet. In one embodiment, the present technology, for example, is stored as an application 924 or module 926 in memory locations within RAM 908 and memory areas within data storage unit 912. The present technology may be applied to one or more elements of described system 900.

System 900 also includes one or more signal generating and receiving device(s) 930 coupled with bus 904 for enabling system 900 to interface with other electronic devices and computer systems. Signal generating and receiving device(s) 930 of the present embodiment may include wired serial adaptors, modems, and network adaptors, wireless modems, and wireless network adaptors, and other such communication technology. The signal generating and receiving device(s) 930 may work in conjunction with one or more communication interface(s) 932 for coupling information to and/or from system 900. Communication interface 932 may include a serial port, parallel port, Universal Serial Bus (USB), Ethernet port, Bluetooth, thunderbolt, near field communications port, WiFi, Cellular modem, or other input/output interface. Communication interface 932 may physically, electrically, optically, or wirelessly (e.g. via radio frequency) couple system 900 with another device, such as a cellular telephone, radio, or computer system.

The computing system 900 is only one example of a suitable computing environment and is not intended to suggest any limitation as to the scope of use or functionality of the present technology. Neither should the computing system 900 be interpreted as having any dependency or requirement relating to any one or combination of components illustrated in the example computing system 900.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A system for non-contact location and orientation determination for an implement coupled with a mobile machine comprising:

> first and second sensors mounted at first and second known locations on different positions of the mobile machine, the first and second sensors are configured to detect an orientation of respective first and second recognized features of the implement and for determining respective range measurements from the first and second sensors to the first and second recognized features, each of the first and second sensors comprising:

an orientation module to provide orientation information for the recognized feature of the implement; and
a range determiner to provide the respective range measurement from one of the first and second sensors to the respective first or second recognized feature of the implement, wherein each of the first and second sensors comprise a laser source configured to sweep a plurality of laser beams in a single line along at least one directional axis beginning from a region on the implement and ending at a region past the implement through the respective recognized feature such that a first portion of the plurality of laser beams hit the implement while a second portion of the plurality of laser beams pass the implement, and wherein the respective range measurement comprises the measured ranges from the first and second portion of the plurality of laser beams and is used for determining an orientation of the implement;
an implement evaluator to access a database and obtain known operating envelope characteristics of the implement coupled with the mobile machine, wherein the known operating envelope characteristics of the implement comprises range of motion characteristics of the implement; and
an implement location and orientation determiner to combine the orientation information, the range measurements and the known operating envelope characteristics to provide a position of the implement with respect to the mobile machine.

2. The system of claim 1 further comprising:
a calibration module to calibrate the sensor with respect to the implement, said calibration comprising:
a determiner to determine a flat and level orientation of the implement with respect to the mobile machine.

3. The calibration module of claim 2 further comprising:
a range of motion definer to provide a range of motion characteristics of the implement with respect to the mobile machine.

4. The system of claim 1 wherein the first and second recognized features are edges of the implement.

5. The system of claim 1 wherein the first and second recognized features are corners of the implement.

6. The system of claim 1 wherein the first and second recognized features are telltales attached to the implement, each telltale having a known distance from the implement.

7. The system of claim 1 wherein the first and second recognized features are fiducials designed to improve a camera's detection capabilities.

8. The system of claim 7 wherein the fiducials are attached to known locations on the implement.

9. The system of claim 1 wherein the first and second recognized features are known light patterns projected onto the implement.

10. The system of claim 1 wherein the sensor comprises:
a first single axis sensor mounted at the known location on the mobile machine, the first single axis sensor not mounted on the implement coupled with the mobile machine; and
a second single axis sensor mounted at a second known location on the mobile machine, the second single axis sensor not mounted on the implement coupled with the mobile machine.

11. The system of claim 10 wherein the first and second single axis sensor are selected from the group consisting of: a horizontal axis sweeping sensor and a vertical axis sweeping sensor, two horizontal axis sweeping sensors; and two vertical axis sweeping sensors.

12. A method for non-contact location and orientation determination for an implement coupled with a mobile machine with respect to the mobile machine, said method comprising:
detecting an orientation of first and second recognized features of the implement with first and second sensors mounted at different fixed locations on the mobile machine, each sensor detecting the orientation by sweeping, with a laser source, a plurality of laser beams in a single line along at least one directional axis beginning from a region on the implement and ending at a region past the implement through the respective recognized feature such that a first portion of the plurality of laser beams hit the implement while a second portion of the plurality of laser beams pass the implement;
determining respective ranges from the first and second sensors to the recognized feature of the implement;
accessing a known operating envelope characteristic of the implement coupled with the mobile machine, wherein the known operating envelope characteristic of the implement comprises range of motion characteristics of the implement; and
combining the known operating envelope characteristic of the implement with the orientation and the range measurements from the first and second sensors to determine a position of the implement with respect to the mobile machine.

13. The method of claim 12 further comprising:
calibrating the first and second sensors with respect to the implement, said calibrating comprising:
establishing a flat and level orientation of the implement with respect to the mobile machine; and
ascertaining the range of motion characteristics of the implement with respect to the mobile machine.

14. The method of claim 12 further comprising:
receiving geo-spatial location information about the mobile machine from a navigation satellite system (NSS) receiver coupled with the mobile machine;
providing respective distances from the NSS to the first and second sensors; and
utilizing the geo-spatial location information in conjunction with the position of the implement to provide geo-spatial location and position information of the implement.

15. The method of claim 12 wherein the first and second recognized features are selected from the group consisting of: an edge of the implement, a corner of the implement, a telltale attached to the implement.

16. The method of claim 12 further comprising:
mounting a 3 dimensional sensor at the fixed location on the mobile machine, the sensor not mounted on the implement coupled with the mobile machine.

17. The method of claim 12 further comprising:
mounting a first single axis sensor at the fixed location on the mobile machine, the first single axis sensor not mounted on the implement coupled with the mobile machine; and
mounting a second single axis sensor at a second fixed location on the mobile machine, the second single axis sensor not mounted on the implement coupled with the mobile machine.

18. The method of claim 17 wherein the first and second single axis sensor is selected from the group consisting of: a horizontal axis sweeping sensor and a vertical axis sweeping sensor, two horizontal axis sweeping sensors; and two vertical axis sweeping sensors.

19. A system for non-contact location and orientation determination of an implement coupled with a mobile machine with respect to a real world coordinate system comprising:
   first and second sensors mounted at first and second known locations on different positions of the mobile machine, the first and second sensors are configured to detect respective range measurements from the first and second sensors to the first and second recognized features of the implement, wherein each of the first and second sensors comprises a laser source configured to sweep a plurality of laser beams in a single line along at least one directional axis beginning from a region on the implement and ending at a region past the implement through the respective recognized feature such that a first portion of the plurality of laser beams hit the implement while a second portion of the plurality of laser beams pass the implement, and wherein the respective range measurement comprises the measured ranges from the first and second portion of the plurality of laser beams and is used for determining an orientation of the implement;
   an implement evaluator to access a database and obtain known operating envelope characteristics of the implement coupled with the mobile machine, wherein the known operating envelope characteristics of the implement comprises range of motion characteristics of the implement;
   a location information determiner to determine geo-spatial location information for a real world geo-spatial location of the mobile machine, the location information determiner coupled with the mobile machine a known distance from the sensor; and
   an implement location and orientation determiner to combine the orientation and the range measurements from the sensor with the known operating envelope characteristics and geo-spatial location information, to provide the location and orientation of the implement with respect to the real world geo-spatial location.

20. The system of claim 19 further comprising:
   a calibration module to calibrate the first and second sensors with respect to the implement, said calibration module comprising:
      a determiner to determine a flat and level orientation of the implement with respect to the mobile machine; and
      a range of motion definer to provide the range of motion characteristics of the implement with respect to the mobile machine.

21. The system of claim 19 wherein the location information determiner is a navigation satellite system (NSS) receiver.

22. The system of claim 19 wherein the location information determiner comprises:
   a location and mapping sensor to determine the real world geo-spatial location for the mobile machine, the location and mapping sensor comprising:
      a scanner to scan an area around the mobile machine and provide range information to at least one point of reference;
      a database accessor to access a mapping database including location information for the at least one point of reference; and
      a position determiner to utilize the range information and the location information to determine the real world geo-spatial location of the location and mapping sensor.

* * * * *